United States Patent
Capoglu et al.

(10) Patent No.: US 11,268,834 B2
(45) Date of Patent: Mar. 8, 2022

(54) SYSTEMS AND METHODS TO REDUCE ACOUSTIC NOISE IN FIBER OPTIC BASED SENSOR SYSTEMS

(71) Applicant: Halliburton Energy Services, Inc., Houston, TX (US)

(72) Inventors: Ilker R. Capoglu, Houston, TX (US); Xinwei Lan, Houston, TX (US); Yenny Natali Martinez, Houston, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 487 days.

(21) Appl. No.: 16/467,834

(22) PCT Filed: Feb. 28, 2017

(86) PCT No.: PCT/US2017/020001
§ 371 (c)(1),
(2) Date: Jun. 7, 2019

(87) PCT Pub. No.: WO2018/160170
PCT Pub. Date: Sep. 7, 2018

(65) Prior Publication Data
US 2021/0223067 A1 Jul. 22, 2021

(51) Int. Cl.
*G01D 5/353* (2006.01)
*G01V 8/24* (2006.01)

(52) U.S. Cl.
CPC .............. *G01D 5/353* (2013.01); *G01V 8/24* (2013.01)

(58) Field of Classification Search
CPC .......... G01D 5/353; G01V 8/24; G01H 9/004; G01L 1/242; G01K 11/32
See application file for complete search history.

(56) References Cited

U.S. PATENT DOCUMENTS

| 8,305,081 B2 | 11/2012 | Reiderman et al. |
| 10,241,229 B2 | 3/2019 | Samson et al. |

(Continued)

FOREIGN PATENT DOCUMENTS

| WO | 2014120305 | 8/2014 |
| WO | 2015178876 | 11/2015 |

(Continued)

OTHER PUBLICATIONS

Udd, Eric, and William B. Spillman Jr, eds. Fiber optic sensors: an introduction for engineers and scientists. John Wiley & Sons, 2011.

(Continued)

*Primary Examiner* — Tony Ko
(74) *Attorney, Agent, or Firm* — McGuireWoods LLP

(57) ABSTRACT

The disclosed embodiments include an acoustic noise reduction device. In one embodiment, the device includes a first sensor operable to detect a first acoustic noise signal and a desired signal and to modulate a first plurality of optical signals in response to detecting at least one of the first acoustic noise signal and the desired signal. The device also includes a second sensor operable to detect a second acoustic noise signal and modulate a second plurality of optical signals in response to detecting the second acoustic noise signal. The device further includes a coupler that is connected to the first and second sensors, where components of the modulated first and second plurality of optical signals approximately cancel each other out.

20 Claims, 6 Drawing Sheets

(56) References Cited

U.S. PATENT DOCUMENTS

| | | |
|---|---|---|
| 2002/0134144 A1 | 9/2002 | Gysling et al. |
| 2003/0174338 A1 | 9/2003 | Baney et al. |
| 2014/0139225 A1 | 5/2014 | Mandviwala |
| 2015/0014521 A1 | 1/2015 | Barfoot |
| 2015/0135819 A1 | 5/2015 | Petrella et al. |
| 2015/0377661 A1 | 12/2015 | Edwards et al. |
| 2016/0161296 A1 | 6/2016 | Handerek |
| 2017/0082770 A1 | 3/2017 | Mandviwala et al. |
| 2017/0123096 A1 | 5/2017 | Wilson et al. |
| 2018/0259672 A1 | 9/2018 | Samson et al. |
| 2019/0120044 A1 * | 4/2019 | Langnes ............... E21B 47/135 |

FOREIGN PATENT DOCUMENTS

| | | |
|---|---|---|
| WO | 2015178878 | 11/2015 |
| WO | 2017105467 | 6/2017 |

OTHER PUBLICATIONS

International Search Report and Written Opinion dated Nov. 27, 2017; International PCT Application No. PC/TUS2017/020001.

* cited by examiner

SYSTEMS AND METHODS TO REDUCE ACOUSTIC NOISE IN FIBER OPTIC BASED SENSOR SYSTEMS

BACKGROUND

The present disclosure relates generally to acoustic noise reduction devices and acoustic noise reduction systems deployed to reduce acoustic noise in fiber optic based sensor systems, and methods to reduce acoustic noise in fiber optic based sensor systems.

Fiber-optic based sensor systems are sometimes deployed in a wellbore of a downhole hydrocarbon production environment to measure and monitor the downhole environment. For example, the sensor systems may utilize one or more types of sensors to measure signals indicative of the electrical, magnetic, chemical, temperature, pressure, pH, humidity, vibration, displacement, velocity, torque, acceleration, as well as other properties of the downhole environment (collectively referred to as the "desired signals"). These sensor systems are sometimes coupled to a fiber optic cable that extends from a surface location down the wellbore, and are deployed proximate one or more zones of interest to measure the desired signals. The desired signals are sometimes transmitted along one or more optical fiber segments of the fiber optic cable to a downhole transmitter, or directly to a surface based electronic device, for transmission or for analysis of the desired signals, respectively.

However, acoustic noise ("noise signals") is sometimes detected by the sensors. These noise signals may interfere with the desired signals, and may deteriorate the quality of the desired signals.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

Figure 1A:
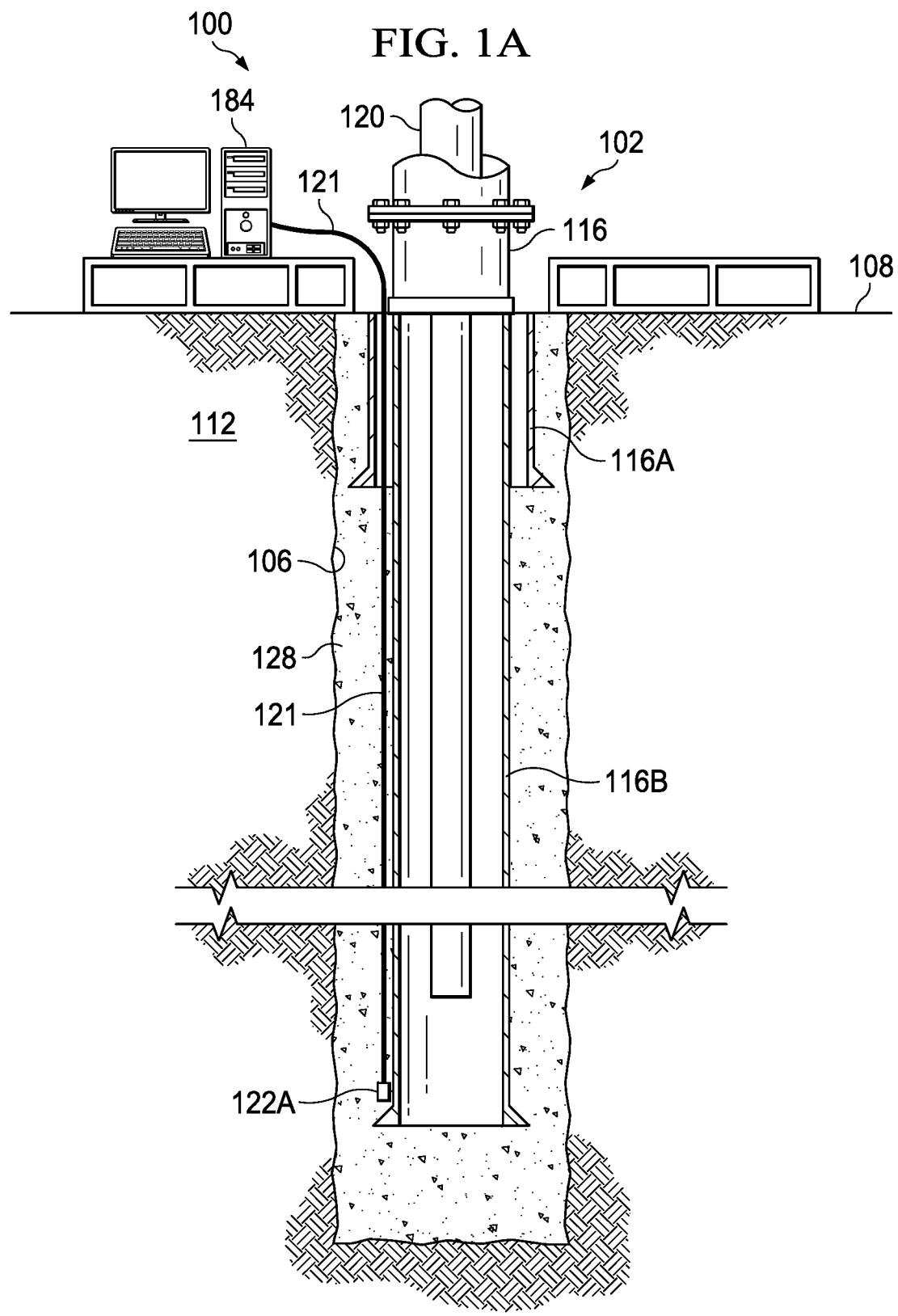
FIG. 1A illustrates a schematic view of a production environment in which an acoustic noise reduction device is coupled to a fiber optic cable and is deployed together with the fiber optic cable along an exterior surface of a casing.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to acoustic noise reduction devices and acoustic noise reduction systems deployed to reduce acoustic noise in fiber optic based sensor systems, and also relates to methods to reduce acoustic noise in fiber optic based sensor systems. The acoustic noise reduction device includes a first sensor and a second sensor, and is coupled to or is a component of a fiber optic based sensor system. As defined herein, the first and second sensors include any sensor operable to detect acoustic noise ("noise signals"), which includes any unwanted acoustic signals.

The first sensor and the second sensor are connected to a coupler via different optical fiber segments. As defined herein, the coupler may be any device, or component thereof that is operable to pass light particles ("optical signals") to the first and second sensors. Optical signals that pass through the first and the second sensors may be modulated by the first and the second sensors, where the modulated optical signals are indicative of the noise signals and/or the desired signals. For example, the first and second sensors are operable to modulate a first and second pluralities of optical signals in response to the detected noise signals, respectively. In some embodiments, the desired signals represent one or more forms of non-optical signals. In one of such embodiments, the desired signals represent one or more forms of electrical signals, magnetic signals, electromagnetic signals, mechanical signals, chemical signals, signals indicative of pressure, signals indicative of temperature, signals indicative of strain, as well as other types of non-acoustic signals. The first and second sensors are positioned proximate to each other and are rigidly secured to each other or to a supporting frame by one or more mechanical means to prevent motion of one of the two sensors relative to another one of the two sensors. The foregoing configuration facilitates both the first and the second sensors to both detect noise signals, where the signal properties of the detected noise signals are approximately identical. The first and second sensors are further operable to modulate the first and second pluralities of optical signals, respectively, based on the detected noise signals, thereby creating phase shifts to the first and second pluralities of optical signals, respectively. For example, noise signals generated by a nearby tool are picked up by both the first and the second sensors. Further, the noise signals creates phase shifts to the first and second plurality of optical signals, respectively. The first sensor is further operable to modulate the first plurality of optical signals in response to detecting desired signals indicative of one or more properties of the downhole environment as discussed herein, thereby creating another phase shift to the first plurality of optical signals. The first and second pluralities of modulated optical signals are then reflected back toward the coupler.

Components of the first and second pluralities of modulated optical signals that are indicative of the noise signals detected by the first and second sensors cancel each other out when superimposed due to the phase shifts that are indicative of the noise signals being approximately identical. However, since only the first plurality of optical signals is modulated by the desired signals, the component of the first plurality of optical signals indicative of the desired signals is not canceled out by any component of the second plurality of modulated optical signals. The coupler passes the component of first plurality of modulated optical signals indicative of the desired signals through a third segment of the optical fiber, where the foregoing component is processed by a signal detector or another electronic and/or optoelectronic device operable to analyze optical signals. In some embodiments, the signal detector is a square-law detector, an optical detector, or another type of detector that is operable to detect the desired signals.

In some embodiments, multiple acoustic noise reduction devices may be coupled together to form an acoustic noise reduction system. In such embodiments, different acoustic noise reduction devices may be positioned proximate different areas and/or zones of interest to detect different types of desired signals and to cancel out noise signals. Additional details of the foregoing acoustic noise reduction device and acoustic noise reduction system are provided in the paragraphs below and are illustrated in at least FIGS. 1-4.

Now turning to the figures, FIG. 1A illustrates a schematic view of a production environment 100 in which a first acoustic noise reduction device 122A is coupled to a fiber optic cable 121 and is deployed together with the fiber optic cable 121 along an exterior surface of a casing 116. In some embodiments, the fiber optic cable 121 is fixedly secured to the casing 116 by multiple cross coupling protectors (not shown) that secure the fiber optic cable 131 to the casing 116. Well 102 includes a wellbore 106, which extends from surface 108 of the well 102 to or through a subterranean formation 112. The casing 116 extends from the surface 108 of well 102 down wellbore 106 to insulate downhole tools and strings deployed in the casing 116 as well as hydrocarbon resources flowing through casing 116 from the surrounding subterranean formation 112, to prevent cave-ins, and/or to prevent contamination of the surrounding subterranean formation 112. The casing 116 is normally surrounded by a cement sheath 128 formed from cement slush, and deposited in an annulus between the casing 116 and the wellbore 106 to fixedly secure the casing 116 to the wellbore 106 and to form a barrier that isolates the casing 116. As depicted in FIG. 1A, the casing 116 includes surface casing 116A and production casing 116B and the fiber optic cable 121 is fixedly secured to the production casing 116B. In one or more embodiments, there may be additional layers of casing concentrically placed in the wellbore 106, each having a layer of cement or the like deposited thereabout.

The fiber optic cable 121 is fitted with the first acoustic noise reduction device 122A and extends along the casing 116 down the wellbore 106. In such embodiments, the fiber optic cable 121 and the first acoustic noise reduction device 122A are permanently deployed downhole during the operational life expectancy of the well 102 to detect desired signals indicative of one or more downhole properties discussed herein and to reduce and/or cancel noise signals that interfere with the desired signals.

A conveyance 120 is deployed in an annulus of the casing 116. In some embodiments, the conveyance 120 may be wireline, slickline, coiled tubing, drill pipe, downhole tractor or another type of conveyance operable to deploy an acoustic noise reduction sensor and anon-permanently deployed fiber optic cable during the operation of the well 102. In such embodiments, the acoustic noise reduction sensor and the non-permanently deployed fiber optic cable may be temporarily deployed proximate a location of interest downhole to detect desired signals indicative of one or more downhole properties discussed herein and to reduce and/or cancel noise signals that interfere with the desired signals. As defined herein, a tool or component is permanently deployed if the tool or component is deployed for substantially the operational duration of the well 102, whereas the tool or component is temporarily deployed if the tool or component is deployed for less than substantially the operational duration of the well 102. As depicted FIG. 1A, the fiber optic cable 121 is directly connected to controller 184, which includes any electronic and/or optoelectronic device or detector operable to receive and/or process optical signals transmitted by the fiber optic cable 121. In one or more embodiments, optical signals transmitted along the fiber optic cable 121 may be relayed by another device or telemetry system to the controller 184.

The first acoustic noise reduction device 122A includes a coupler, a first sensor, and a second sensor. As stated herein, both the first and the second sensors are operable to modulate a first and a second plurality of optical signals, respectively, in response to detecting the noise signals. Moreover, the foregoing modulations to the first and second plurality of optical signals due to the acoustic noise create a first phase shift to the first plurality of optical signals and a first phase shift to the second plurality of optical signals, respectively. However, only the first optical sensor also modulates the first plurality of optical signals in response to detecting the desired signals. As such, the modulation of the first plurality of optical signals due to the desired signals further creates a second phase shift to the first plurality of acoustic signals. The first and second pluralities of modulated optical signals are then transmitted to the coupler. In some embodiments, coupler superimposes the first and second pluralities of modulated optical signals. Moreover, components of the first and second pluralities of modulated signals that are indicative of the noise signals as detected by the first and second sensors cancel each out when superimposed due to the first phase shift of the first plurality of optical signals and the first phase shift of the second plurality of optical signals being approximately identical. In some embodiments, the cancellation of the noise signals is due to the optical interference of the first plurality of modulated optical signals relative to the second plurality of modulated optical signals. As noted herein, the optical interference that occurs at the coupler or at another optical component operable to superimpose the modulated optical signals is different from acoustic noise and/or interference due to noise signals. However, since only the first plurality of modulated optical signals contain a component that is indicative of the desired signals ("desired component"), this component is not canceled by a corresponding out of phase component and is passed by the coupler.

The desired component of the first plurality of modulated optical signals then traverses the fiber optic cable 121 where the desired component is received by the controller 184 or another surface based and/or downhole electronic device operable to process the desired component to analyze the desired signals. Additional details of the foregoing acoustic noise reduction device and acoustic noise reduction system are provided in the paragraphs below and are illustrated in at least FIGS. 2-4. Although, FIG. 1A illustrates the first acoustic noise reduction device 122A, additional acoustic noise reduction devices (not shown) may be deployed at different sections of the fiber optic cable 121, or along the conveyance 120 to detect other desired signals indicative of one or more properties of the downhole environment as discussed herein and to reduce and/or cancel acoustic noise signals, which may reduce signal properties of the desired signals. Further, although FIG. 1A illustrates deploying the fiber optic cable 121 in downhole environments of on shore wells, the fiber optic cable 121 may also be deployed in subsea environments such as in offshore wells, or along the seafloor.

Figure 1B:
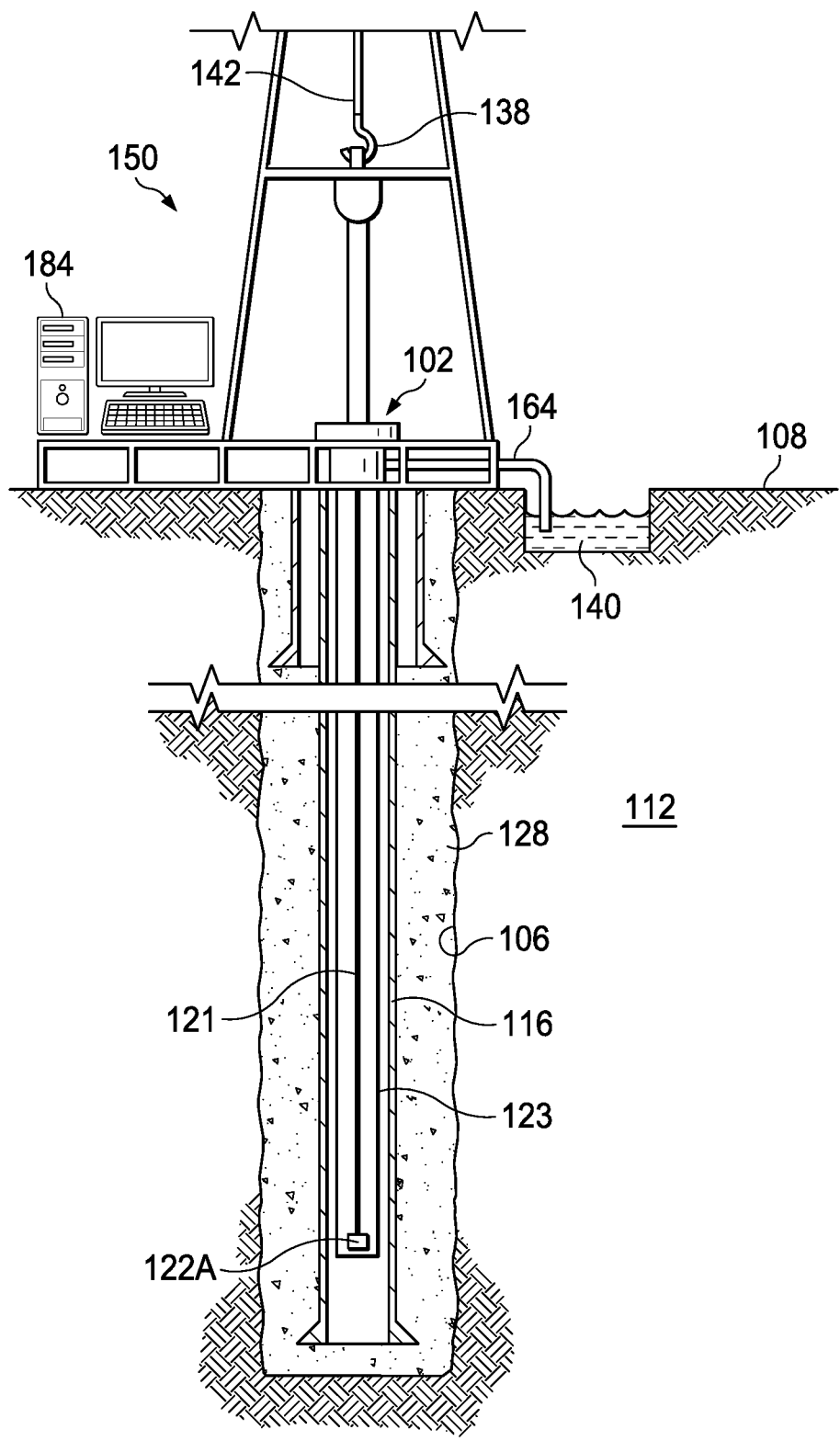
FIG. 1B illustrates a schematic view of another production environment in which the acoustic noise reduction device of FIG. 1A is coupled to the fiber optic cable of FIG. 1A and is deployed together with the fiber optic cable along a production tubing.

In some embodiments, the first acoustic noise reduction device 122A is not permanently deployed along the casing 116. FIG. 1B illustrates a schematic view of another production environment 150 in which the first acoustic noise reduction device 122A and the fiber optic cable 121 of FIG. 1A are deployed along a production tubing 123.

A hook 138, cable 142, traveling block (not shown), hoist (not shown) are provided to lower the production tubing 123 down the wellbore 106 prior to commencement of the production phase or to lift the production tubing 123 up from the wellbore 106 upon completion of the production phase or to service the production tubing 123 and/or one or more components deployed along the production tubing 123. In some embodiments, the production tubing 123 is permanently deployed in the wellbore 106 during the production phase. The fiber optical cable 121 is deployed along the production tubing 123 and forms a telemetry system described herein. The production tubing 123 has an internal cavity that provides a fluid flow path for fluids, such as hydrocarbon resources, to flow from the subterranean formation 112 to the surface 108. During the production phase, hydrocarbon resources flow along the internal cavity, towards the surface 108, and exits the internal cavity via an outlet conduit 164 where the hydrocarbon resources are captured in a container 140.

The first acoustic noise reduction device 122A may be deployed at different depths during the production phase to monitor hydrocarbon production and reservoir properties at the different depths. As depicted in FIG. 1B, the first acoustic noise reduction device 122A is coupled to the fiber optical cable 121 that runs along the production tubing 123. In one or more embodiments, multiple acoustic noise reduction devices are coupled to different sections of the fiber optical cable 121 to reduce acoustic noise detected by the fiber optical cable 121 at different depths.

Figure 1C:
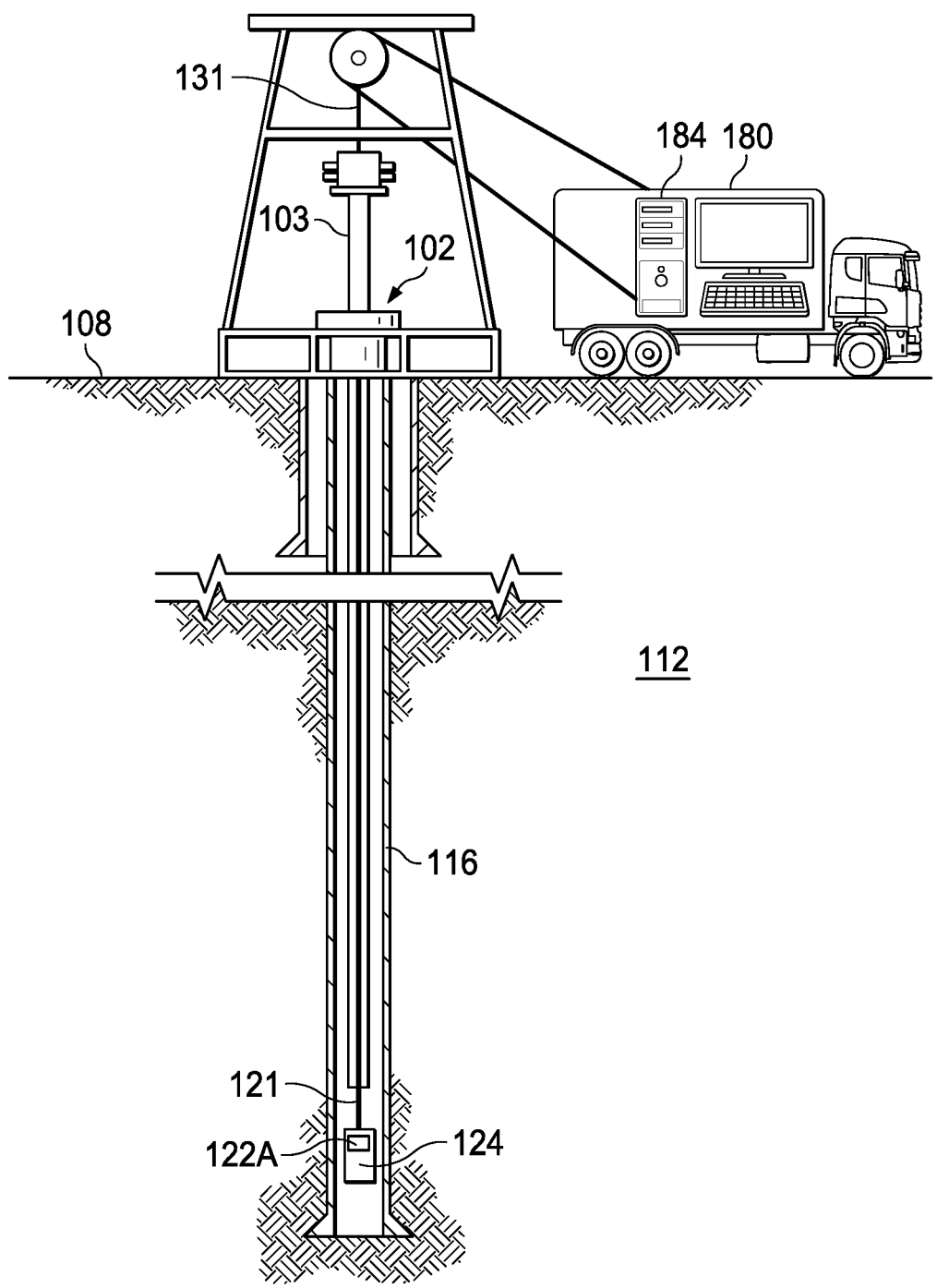
FIG. 1C illustrates a wireline environment in which the acoustic noise reduction device and fiber optic cable of FIG. 1A are coupled to a retrievable conveyance.

FIG. 1C illustrates a wireline environment 170 in which the first acoustic noise reduction device 122A and fiber optic cable 121 are of FIG. 1A are deployed along a retrievable conveyance 131. As stated herein, the retrievable conveyance may be formed from wireline, slickline, coiled tubing, drill pipe, downhole tractor or another type of conveyance operable to deploy an acoustic noise reduction sensor and a non-permanently deployed fiber optic cable during the operation of the well 102. In the embodiment of FIG. 1C, the first acoustic noise reduction device 122A is a component of a logging tool 124. A vehicle 180 carrying sections of the retrievable conveyance 131 is positioned proximate the well 102. The retrievable conveyance 131 along with the fiber optic cable 121, the logging tool 124 and the first acoustic noise reduction device 122A are lowered through the blowout preventer 103 into the well 102.

Figure 2:
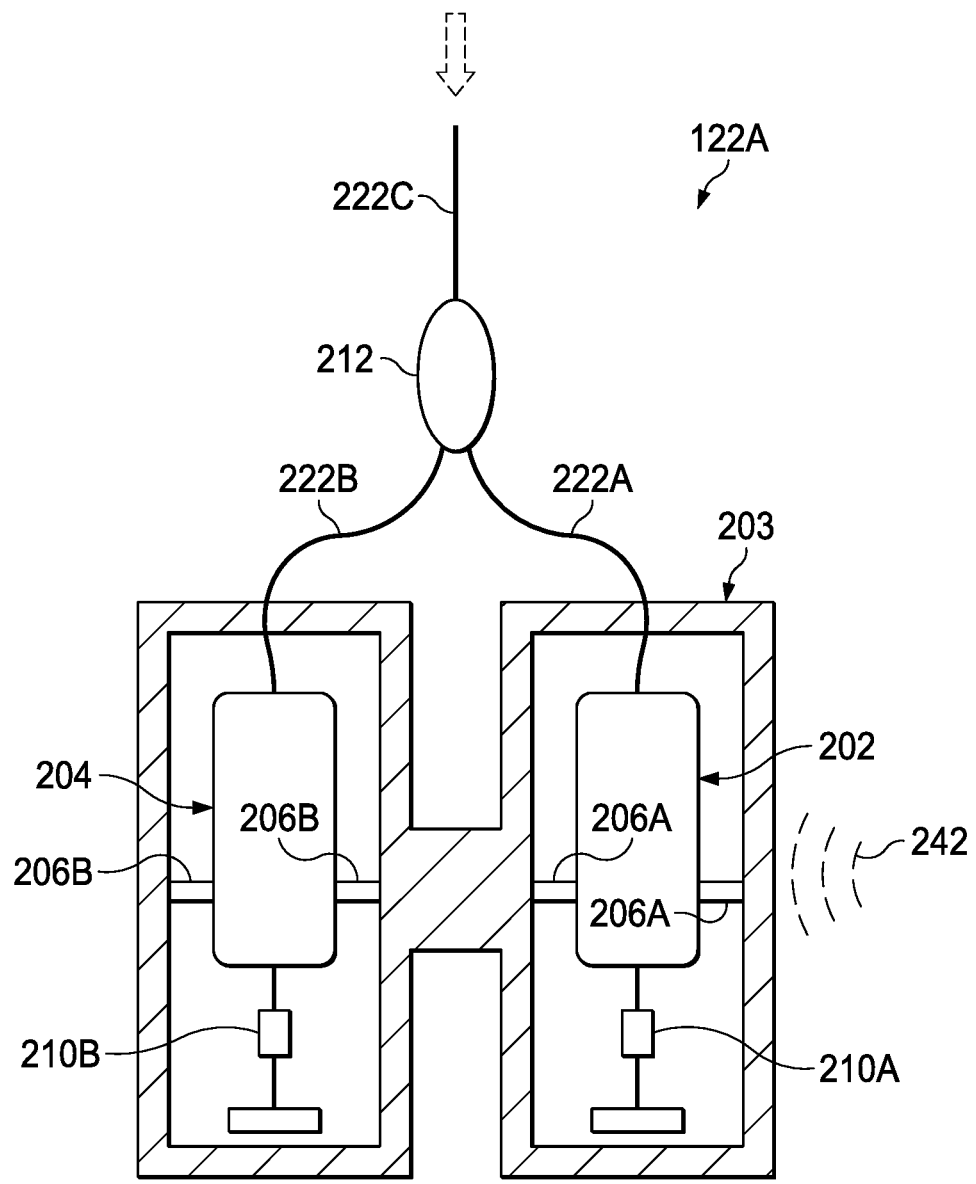
FIG. 2 illustrates a schematic, cross-sectional view of the first acoustic noise reduction device of FIG. 1A.

FIG. 2 illustrates a schematic, cross-sectional view of the first acoustic noise reduction device 122A of FIG. 1A. As shown in FIG. 2, the first acoustic noise reduction device 122A includes a first sensor 202, a second sensor 204, and a coupler 212. A supporting frame 203 and fasteners 206A and 206B prevent movement of one of the two sensors 202 and 204 relative to the other sensor of the two sensors 202 and 204. In one or more embodiments, the first and second sensors 202 and 204 are fixedly secured by other means to prevent movement of one sensor relative to the other sensor. The first and second sensors 202 and 204 are coupled to the coupler 212 via a first segment of optical fiber 222A and a second segment of the optical fiber 222B, respectively. Further, the coupler 212 is also coupled to a third segment of the optical fiber 222C. In some embodiments, the third segment of the optical fiber 222C is directly coupled to the fiber optic cable 121 of FIG. 1A. In one or more embodiments, the third segment of the optical fiber 222C is a section of the fiber optic cable 121. As such, optical signals transmitted from a surface end of the fiber optic cable 121 traverses the fiber optic cable 121, through the third segment of the fiber 222C, to the coupler 212. The coupler 212 is operable to divert a first component of the optical signals ("first plurality of optical signals") transmitted downhole through the fiber optic cable 121 to the first segment of the optical fiber 222A and a second component of the optical signals ("second plurality of optical signals") to the second segment of the optical fiber 222B. The first plurality of optical signals traverse the first segment of the optical fiber 222A until the first plurality of optical signals reach the first sensor 202.

As stated herein, the first sensor 202 and the second sensor 204 are operable to modulate the first plurality of optical signals and the second plurality of optical signals in response to detecting the acoustic noise signals. The first and second sensors 202 and 204 are positioned proximate to each other and are fixedly secured to each other. As such, noise signals detected by one of the two sensors 202 and 204 are approximately detected by the other sensor of the two sensors 202 and 204, such that the signal profiles of the noise signals detected by the two sensors 202 and 204 are approximately identical. The first sensor 202 is further operable to detect desired signals indicative of one or more downhole properties discussed herein. In FIG. 2, the desired signals are represented by waveform 242. However, the second sensor 204 is not utilized to detect or to receive the desired signals, and as such, does not modulate the second plurality of acoustic signals based on any desired signals. As depicted in FIG. 2, in one or more embodiments the first plurality of modulated optical signals and the second plurality of modulated optical signals are partially and/or fully reflected by a first reflector 210A and by a second reflector 210B, respectively. In some embodiments, the first and second plurality of modulated optical signals are reflected and/or redirected by additional components, such as circulators, modulators, and/or other components operable to reflect and/or redirect optical signals. The first and second pluralities of modulated optical signals then traverse the first and second segments of optical fiber 222A and 222B until the first and second pluralities of modulated optical signals reach the coupler 212.

In some embodiments, the coupler 212 superimposes the first and second pluralities of modulated optical signals. When the first and second pluralities of modulated signals are superimposed, components of the first and second pluralities of modulated signals that are indicative of the noise signals as detected by the first and second sensors each out due to being approximately identical. However, the first component of the first plurality of modulated optical signals, which is indicative of the desired signals is not canceled by a corresponding out of phase component. The desired component of the first plurality of modulated optical signals, which is indicative of the desired signals, is passed by the coupler 212 via the third segment of the optical fiber 222C, to the fiber optic cable 121. The desired component of the first plurality of modulated optical signals then traverses the fiber optic cable 121 until the desired component is received and processed by the controller 184.

In some embodiments, the first and second sensors 202 and 204 utilize optical signals transmitted downhole to the coupler 212 to power the sensors 202 and 204, respectively, and/or other components communicatively coupled to the sensors 202 and 204, respectively. In that regard, the coupler 212 is operable to divert components of optical signals transmitted downhole along the fiber optic cable 121 to the first and the second segments of optical fiber 222A and 222B. For example, the coupler 212 is operable to divert a first component of a third plurality of optical signals to the first segment of the optical fiber 222A, and divert a second component of the third plurality of optical signals to the second segment of the optical fiber 222B. The first sensor 202 then utilizes the first component of the third plurality of optical signals to power to the first sensor 202, and the second sensor 204 utilizes the second component of the third plurality of optical signals to power the second sensor 204. In one of such embodiments, the signal intensity of the first component of the third plurality of optical signals is approximately identical to the signal intensity of the second component of the third plurality of optical signals. In another one of such embodiments, the signal intensities of the first and second components of the third plurality of optical signals are different.

In some embodiments, the first and second sensors 202 and 204 are operable to adjust the lengths of the first and the second segments of optical fiber 222A and 222B, respectively, such that the length of the first and the second segments of optical fiber 222A and 222B are different relative to each other. In one of such embodiments, the first and second sensors 202 and 204 are manufactured from a piezoelectric material such as lead zirconate titanate ("PZT") and are operable to convert an electrical signal into a mechanical strain to adjust a length of the first segment of the optical fiber 222A, and the second segment of the optical fiber 222B, respectively.

Figure 3:
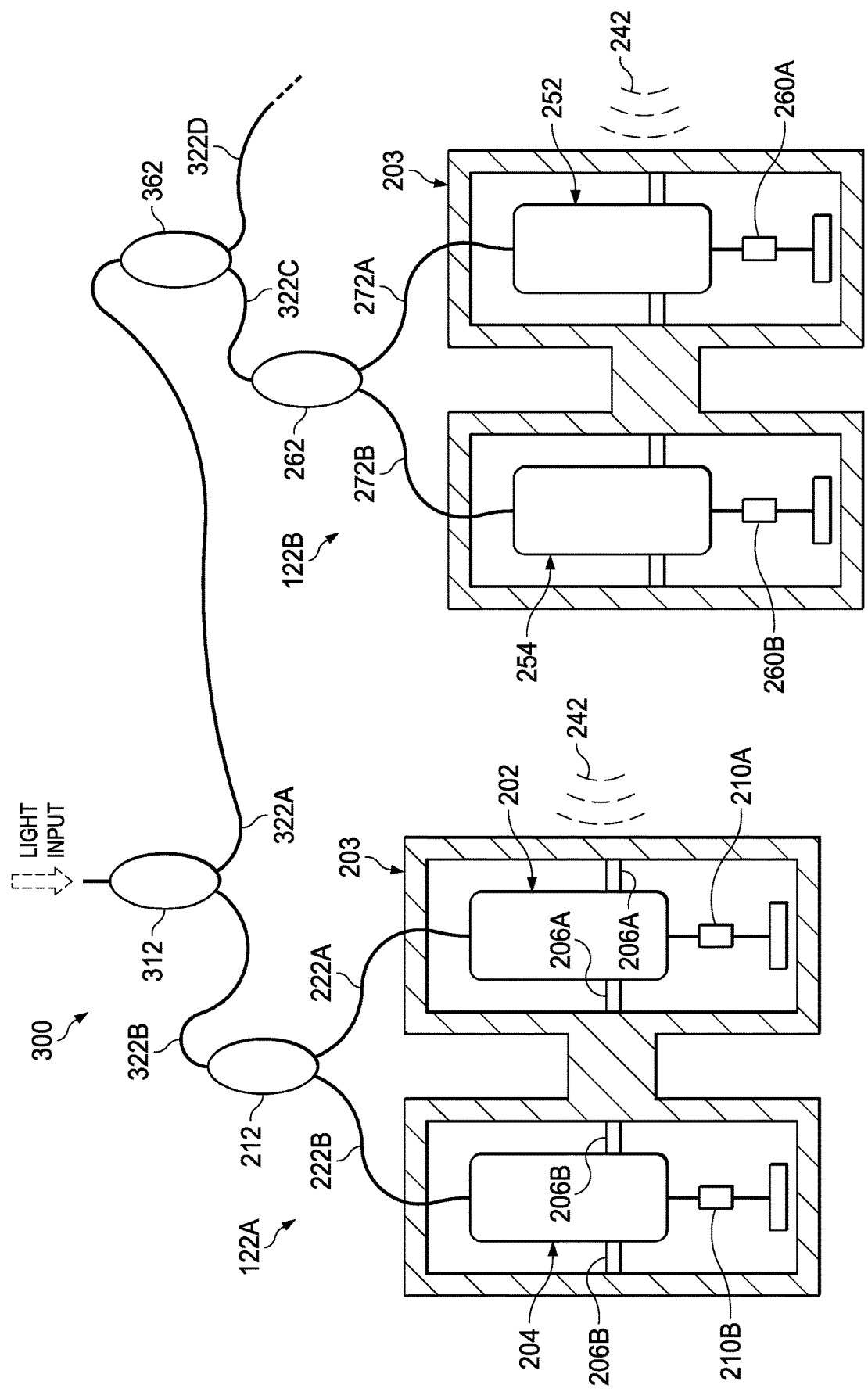
FIG. 3 illustrates a schematic, cross-sectional view of an acoustic noise reduction system formed from multiple acoustic noise reduction devices, including the first acoustic noise reduction device of FIG. 1A.

FIG. 3 illustrates a schematic, cross-sectional view of an acoustic noise reduction system 300 formed from multiple acoustic noise reduction devices, including the first acoustic noise reduction device 122A of FIGS. 1A and 2. As shown in FIG. 3, the acoustic noise reduction system 300 includes the first acoustic noise reduction device 122A of FIGS. 1A and 2. The acoustic noise reduction system 300 includes a first primary coupler 312 coupled to a second primary coupler 362 via a first primary segment of optical fiber 322A. The first primary coupler 312 is further coupled to the coupler 212 of the first acoustic noise reduction device 122A (the coupler 212 referred to in the system 300 as a "secondary coupler of the first acoustic noise reduction device" 212) via a second primary segment of the optical fiber 322B. As defined herein, a primary coupler is not coupled to any sensors, whereas a secondary coupler is coupled to at least one sensor. Further, as defined herein, a primary segment of the optical fiber is not connected to a sensor whereas a secondary segment of the optical fiber is connected to a sensor. Primary and secondary couplers may perform identical operations. Similarly, primary and secondary segments of optical fibers may also perform identical operation. These components are designated different terms when describing the acoustic noise reduction system 300 in order to clearly define and claim similar components of the acoustic noise reduction system 300.

Components of optical signals received at the first primary coupler 312 are diverted to the first and the second primary segments of optical fibers 322A and 322B, which connect the primary coupler 312 to the second primary coupler 362 and the secondary coupler 212 of the first acoustic noise reduction device 122A, respectively. Optical signals indicative of desired signals detected by the first sensor 202 of the first primary acoustic noise reduction device 122A ("first desired signals") pass through the secondary coupler 212, traverse the second primary segment of the optical fiber 322B, pass through the primary coupler 312, traverse the fiber optic cable 121 until the first desired optical signals reach the controller 184. In the embodiment of FIG. 3, the desired signals are represented by waveform 242.

The second primary coupler 362 is also coupled to a second acoustic noise reduction device 122B via a third primary segment of the optical fiber 322C. The second acoustic noise reduction device 122B is deployed at another downhole location to detect desired signals indicative of one or more properties of the downhole environment as discussed herein at or proximate the other downhole location. The second acoustic noise reduction device 122B, similar to the first acoustic noise reduction device 122A, also includes a secondary coupler 262 that is coupled to a first sensor 252 of the second acoustic noise reduction device 122B via a first secondary segment of the optical fiber 272A of the second acoustic noise reduction device 122B, and is coupled to a second sensor 254 of the second acoustic noise reduction device 122B via a second secondary segment 272B of the second acoustic noise reduction device 122B. The first sensor 252 of the second acoustic noise reduction device 122B is operable to detect desired signals and noise signals, whereas the second sensor 254 of the second acoustic noise reduction device 122B is operable to detect the noise signals. The first sensor 252 of the second acoustic noise reduction device 122B is further operable to modulate optical signals in response to detecting noise signals and desired signals, and transmit the modulated signals to the secondary coupler 262 of the second acoustic noise reduction device 122B.

The second sensor 254 of the second acoustic noise reduction device 122B is further operable to modulate optical signals in response to detecting noise signals and transmit the modulated optical signals to the secondary coupler 262 of second acoustic noise reduction device 122B. The secondary coupler 262 of second acoustic noise reduction device 122B, similar to the secondary coupler 212 of the first acoustic noise reduction device 122A.

The secondary coupler 262 of second acoustic noise reduction device 122B also permits the component of the modulated optical signals indicative of the desired signals ("second desired signals") to pass, where the foregoing component of optical signals traverses the third primary segment of the optical fiber 322C, the first primary segment of the optical fiber 322A, and the fiber optic cable 121 to reach the controller 184. In some embodiments, the acoustic noise reduction system 300 also includes a multiplexer (not shown) operable to multiplex the first desired signals with the second desired signals and transmit the multiplexed optical signals to the controller 184. Additional primary and secondary couplers may be added to the acoustic noise reduction system 300. For example, a third primary coupler (not shown) may be coupled to the second primary coupler 362 via a fourth primary segment of the optical fiber 322D and may be coupled to a third acoustic noise reduction device (not shown) via a fifth primary segment of the optical fiber (not shown).

Figure 4:
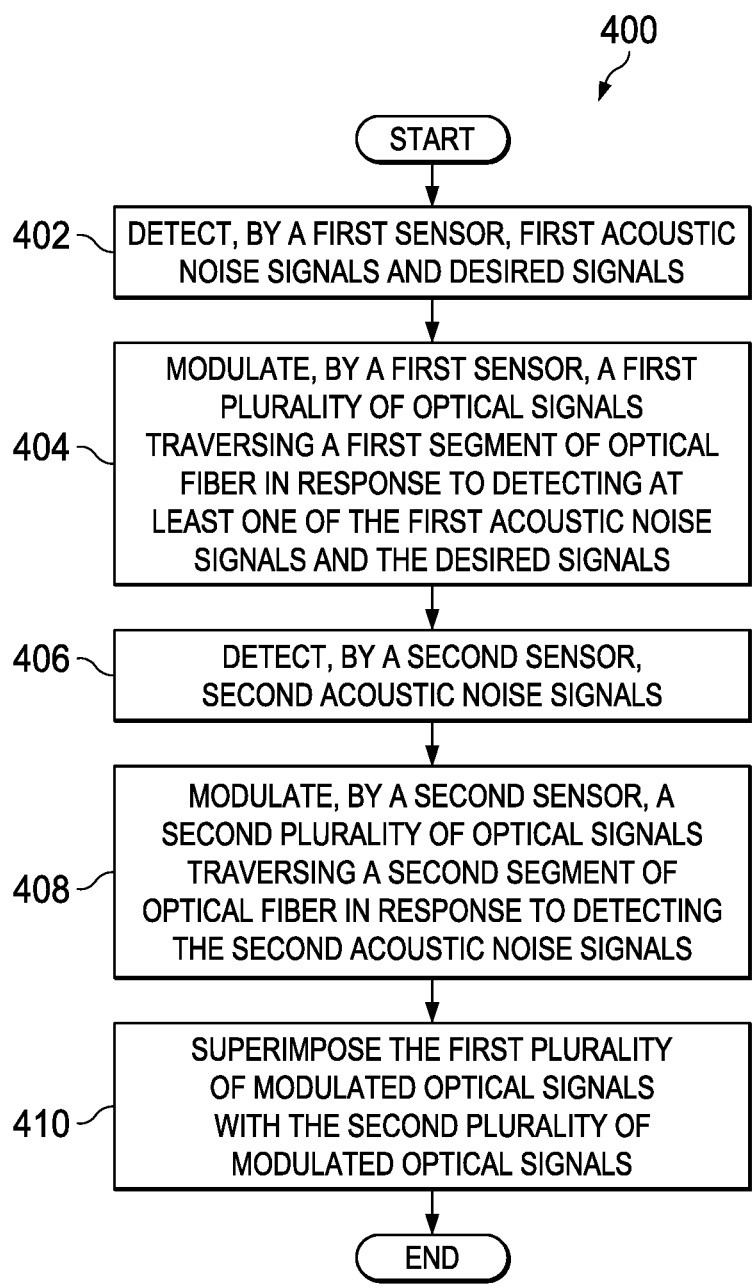
FIG. 4 illustrates a flow chart of a process to reduce acoustic noise.

FIG. 4 illustrates a flow chart of a process 400 to reduce acoustic noise. Although operations in the process 400 are shown in a particular sequence, certain operations may be performed in different sequences or at the same time where feasible. Further, although the process 400 is described as being performed by components of the first acoustic noise reduction device 122A, the steps may also be performed by a different acoustic noise reduction device, such as the second acoustic noise reduction device 122B.

At step 402, the first sensor 202 detects acoustic noise signals and desired signals. At step 404, the first sensor 202 modulates the first plurality of optical signals traversing the first segment of the optical fiber 222A in response to detecting at least one of the acoustic noise signals and the desired signals. At step 406, the second sensor 204 detects the acoustic noise signals. As stated herein, the signal profiles of the acoustic noise signals as detected by the first and second sensors 202 and 204 are approximately identical due to the proximity of the first and second sensors 202 and 204, the lengths of wavelength of the acoustic noise signal as well as the two sensors 202 and 204 being fixedly secured to each other. The modulated first and second pluralities of optical signals are transmitted via the first and second segments of optical fibers 222A and 222B, respectively to the coupler 212. At step 410, the first plurality of modulated optical signals with the second plurality of modulated optical signals are superimposed with each other and components of the first and second pluralities of optical signals indicative of acoustic noise signals cancel each other out due to being approximately identical. However, the desired component of the first plurality of modulated optical signals, which is indicative of the desired signals is not cancelled by the phase shift. The coupler 212 permits the desired component of optical signals to pass through said coupler 212, where the desired component of optical signals traverses the fiber optic cable 121 until said desired component of optical signals reaches the controller 184.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, an acoustic noise reduction device comprising a first sensor connected to a first segment of optical fiber and operable to detect acoustic noise signals and desired signals; and perform a first modulation of a first plurality of optical signals traversing the first segment of the optical fiber in response to detecting at least one of the acoustic noise signals and the desired signals, wherein the first modulation creates at least one of a first phase shift to the first plurality of optical signals due to the acoustic noise signals and a second phase shift to the first plurality of optical signals due to the desired signals; a second sensor coupled to the first sensor and connected to a second segment of the optical fiber, the second sensor operable to detect the acoustic noise signals; and perform a second modulation of a second plurality of optical signals traversing the second segment of the optical fiber in response to detecting the acoustic noise signals, wherein the second modulation creates a first phase shift to the second plurality of optical signals due to the acoustic noise signals, the first phase shift to the first plurality of optical signals being approximately identical to the first phase shift to the second plurality of optical signals; and a coupler connected to the first and the second segments of optical fibers, and connected to a third segment of the optical fiber, the coupler operable to receive the first and second pluralities of modulated optical signals, wherein the first phase shift to the first plurality of optical signals approximately cancels out the first phase shift to the second plurality of optical signals due to the first phase shift of the first plurality of optical signals and the first phase shift of the second plurality of optical signals being approximately identical.

Clause 2, the acoustic noise reduction device of clause 1, wherein the first and second sensors comprise a piezoelectric material operable to convert an electrical signal into a mechanical strain to adjust a first distance from the first sensor to the coupler and a second distance from the second sensor to the coupler, respectively.

Clause 3, the acoustic noise reduction device of clause 1 or 2, further comprising a first reflector operable to direct the first plurality of modulated optical signals to traverse the first segment of the optical fiber towards the coupler; and a second reflector operable to direct the second plurality of modulated optical signals to traverse the second segment of the optical fiber operable to detect the desired signals from the first and second pluralities of modulated signals.

Clause 4, the acoustic noise reduction device of at least one of clauses 1-3, wherein the coupler is further operable to pass the first and second pluralities of modulated signals to a square-law detector.

Clause 5, the acoustic noise reduction device of at least one of clauses 1-3, wherein the coupler is further operable to pass the first and second pluralities of modulated signals to an optical detector operable to detect the desired signals from the first and second pluralities of modulated signals.

Clause 6, the acoustic noise reduction device of at least one of clauses 1-5, wherein the coupler is further operable to receive a third plurality of optical signals from the third segment of the optical fiber; divert a first component of the third plurality optical signals to the first segment of the optical fiber; and divert a second component of the third plurality optical signals to the second segment of the optical fiber, wherein the first component of the third plurality optical signals provides power to the first sensor, and wherein the second component of the third plurality optical signals provides power to the second sensor.

Clause 7, the acoustic noise reduction device of at least one of clauses 1-6, wherein the first component of the third plurality optical signals and the second component of the third plurality optical signals have approximately identical signal intensities.

Clause 8, the acoustic noise reduction device of at least one of clauses 1-7, wherein the acoustic noise reduction device is deployed along a casing deployed in a wellbore of a hydrocarbon production environment.

Clause 9, an acoustic noise reduction system, comprising a first primary coupler; a second primary coupler connected to the first primary coupler via a first primary segment of optical fiber; a first acoustic noise reduction device being connected to the first primary coupler via a second primary segment of the optical fiber; and a second acoustic noise reduction device being connected to the second primary coupler via a third primary segment of the optical fiber, wherein each of the first and second acoustic noise reduction devices comprises a first sensor connected to a first secondary segment of the optical fiber and operable to detect acoustic noise signals and desired signals; and perform a first modulation of a first plurality of optical signals traversing the first secondary segment of the optical fiber in response to detecting at least one of the acoustic noise signals and the desired signals, wherein the first modulation creates at least one of a first phase shift to the first plurality of optical signals due to the acoustic noise signals and a second phase shift to the first plurality of optical signals due to the desired signals; a second sensor coupled to the first sensor and connected to a second secondary segment of the optical fiber, the second sensor operable to detect the acoustic noise signals; and perform a second modulation of a second plurality of optical signals traversing the second secondary segment of the optical fiber in response to detecting the acoustic noise signals, wherein the second modulation creates a first phase shift to the second plurality of optical signals due to the acoustic noise signals, the first phase shift to the first plurality of optical signals being approximately identical to the first phase shift to the second plurality of optical signals; and a secondary coupler connected to the first and the second secondary segments of optical fibers, and connected to a third segment of the optical fiber, the coupler operable to receive the first and second pluralities of modulated optical signals, wherein the first phase shift to the first plurality of optical signals approximately cancels out the first phase shift to the second plurality of optical signals due to the first phase shift of the first plurality of optical signals and the first phase shift of the second plurality of optical signals being approximately identical.

Clause 10, the acoustic noise reduction system of clause 9, wherein the first sensor of the first acoustic noise reduction device is operable to detect a first desired signals, wherein the first sensor of the second acoustic noise reduction device is operable to detect a second desired signals, and wherein the first desired signals and the second desired signals have different signals characteristics.

Clause 11, the acoustic noise reduction system of clause 9 or 10, wherein the first desired signals and the second desired signals are indicative of different types of wellbore conditions.

Clause 12, the acoustic noise reduction system of at least one of clauses 9-11, wherein the different types of wellbore conditions comprise pressure, temperature, pH, and humidity at a wellbore location proximate to one of the first and second acoustic noise reduction devices.

Clause 13, the acoustic noise reduction system of at least one of clauses 9-12, further comprising a multiplexer configured to: multiplex optical signals indicative of the first desired signals with optical signals indicative of the second desired signals to form a multiplexed signals; and transmit the multiplexed optical signals to a square-law detector.

Clause 14, the acoustic noise reduction system of at least one of clauses 9-13, wherein the primary coupler is further operable to receive a third plurality of optical signals from the first primary segment of the optical fiber; divert a first component of the third plurality of optical signals to the first acoustic noise reduction device; and divert a second component of the third plurality of optical signals to the second acoustic noise reduction device, wherein the first component of the third plurality of optical signals provides power to the first acoustic noise reduction device, and wherein the second component of the third plurality of optical signals provides power to the second acoustic noise reduction device.

Clause 15, the acoustic noise reduction system of at least one of clauses 9-14, wherein the first component of the third plurality of optical signals has a signal intensity that is different from a signal intensity of the second component of the third plurality of optical signals.

Clause 16, the acoustic noise reduction system of at least one of clauses 9-15, further comprising a third primary coupler connected to the second primary coupler via a fourth primary segment of the optical fiber; and a third acoustic noise reduction device connected to the third primary coupler via a fifth primary segment of the optical fiber.

Clause 17, a method to reduce acoustic noise, the method comprising detecting, by a first sensor, acoustic noise signals and desired signals; modulating, by the first sensor, a first plurality of optical signals traversing a first segment of optical fiber in response to detecting at least one of the acoustic noise signals and the desired signals, wherein modulating by the first sensor creates at least one of a first phase shift to the first plurality of optical signals due to the acoustic noise signals and a second phase shift to the first plurality of optical signals due to the desired signals; detecting, by a second sensor, the acoustic noise signals, the acoustic noise signals and the acoustic noise signals having approximately identical signal properties and intensities; and modulating, by the second sensor, a second plurality of optical signals traversing a second segment of the optical fiber in response to detecting the acoustic noise signals, wherein modulating by the second sensor creates a first phase shift to the second plurality of optical signals due to the acoustic noise signals, the first phase shift to the first plurality of optical signals being approximately identical to the first phase shift to the second plurality of optical signals, and wherein the first phase shift to the first plurality of optical signals approximately cancels out the first phase shift to the second plurality of optical signals due to the first phase shift of the first plurality of optical signals and the first phase shift of the second plurality of optical signals being approximately identical.

Clause 18, the method of clause 17, further comprising diverting a first component of a third plurality of optical signals to the first segment of the optical fiber; diverting a second component of the third plurality of optical signals to the second segment of the optical fiber; providing the first component of the third plurality of optical signals to power to the first sensor; and providing the second component of the third plurality of optical signals to power to the second sensor.

Clause 19, the method of clause 17 or 18, further comprising passing a component of the first plurality of modulated optical signals indicative of the desired signals via a third segment of the optical fiber to a square-law detector operable to detect the desired signals.

Clause 20, The method of clause 17 or 18, further comprising passing a component of the first plurality of modulated optical signals indicative of the desired signals via a third segment of the optical fiber to an optical detector operable to detect the desired signals.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. An acoustic noise reduction device comprising:
 a first sensor connected to a first segment of optical fiber and operable to:
  detect acoustic noise signals and desired signals; and
  perform a first modulation of a first plurality of optical signals traversing the first segment of the optical fiber in response to detecting at least one of the acoustic noise signals and the desired signals,
  wherein the first modulation creates at least one of a first phase shift to the first plurality of optical signals due to the acoustic noise signals and a second phase shift to the first plurality of optical signals due to the desired signals;
 a second sensor coupled to the first sensor and connected to a second segment of the optical fiber, the second sensor operable to:
  detect the acoustic noise signals; and
  perform a second modulation of a second plurality of optical signals traversing the second segment of the optical fiber in response to detecting the acoustic noise signals,
  wherein the second modulation creates a first phase shift to the second plurality of optical signals due to the acoustic noise signals, the first phase shift to the first plurality of optical signals being approximately identical to the first phase shift to the second plurality of optical signals; and
 a coupler connected to the first and the second segments of optical fibers, and connected to a third segment of the optical fiber, the coupler operable to:
  receive the first and second pluralities of modulated optical signals,
  wherein the first phase shift to the first plurality of optical signals approximately cancels out the first phase shift to the second plurality of optical signals due to the first phase shift of the first plurality of optical signals and the first phase shift of the second plurality of optical signals being approximately identical.

2. The acoustic noise reduction device of claim 1, wherein the first and second sensors comprise a piezoelectric material operable to convert an electrical signal into a mechanical strain to adjust a first distance from the first sensor to the coupler and a second distance from the second sensor to the coupler, respectively.

3. The acoustic noise reduction device of claim 1, further comprising:

a first reflector operable to direct the first plurality of modulated optical signals to traverse the first segment of the optical fiber towards the coupler; and
 a second reflector operable to direct the second plurality of modulated optical signals to traverse the second segment of the optical fiber.

4. The acoustic noise reduction device of claim 1, wherein the coupler is further operable to pass the first and second pluralities of modulated signals to a square-law detector operable to detect the desired signals from the first and second pluralities of modulated signals.

5. The acoustic noise reduction device of claim 1, wherein the coupler is further operable to pass the first and second pluralities of modulated signals to an optical detector operable to detect the desired signals from the first and second pluralities of modulated signals.

6. The acoustic noise reduction device of claim 1, wherein the coupler is further operable to:
 receive a third plurality of optical signals from the third segment of the optical fiber;
 divert a first component of the third plurality optical signals to the first segment of the optical fiber; and
 divert a second component of the third plurality optical signals to the second segment of the optical fiber,
 wherein the first component of the third plurality optical signals provides power to the first sensor, and
 wherein the second component of the third plurality optical signals provides power to the second sensor.

7. The acoustic noise reduction device of claim 6, wherein the first component of the third plurality optical signals and the second component of the third plurality optical signals have approximately identical signal intensities.

8. The acoustic noise reduction device of claim 1, wherein the acoustic noise reduction device is deployed along a casing deployed in a wellbore of a hydrocarbon production environment.

9. An acoustic noise reduction system, comprising:
 a first primary coupler;
 a second primary coupler connected to the first primary coupler via a first primary segment of optical fiber;
 a first acoustic noise reduction device being connected to the first primary coupler via a second primary segment of the optical fiber; and
 a second acoustic noise reduction device being connected to the second primary coupler via a third primary segment of the optical fiber, wherein each of the first and second acoustic noise reduction devices comprises:
  a first sensor connected to a first secondary segment of the optical fiber and operable to:
   detect acoustic noise signals and desired signals; and
   perform a first modulation of a first plurality of optical signals traversing the first secondary segment of the optical fiber in response to detecting at least one of the acoustic noise signals and the desired signals,
   wherein the first modulation creates at least one of a first phase shift to the first plurality of optical signals due to the acoustic noise signals and a second phase shift to the first plurality of optical signals due to the desired signals;
  a second sensor coupled to the first sensor and connected to a second secondary segment of the optical fiber, the second sensor operable to:
   detect the acoustic noise signals; and
   perform a second modulation of a second plurality of optical signals traversing the second secondary segment of the optical fiber in response to detecting the acoustic noise signals,
wherein the second modulation creates a first phase shift to the second plurality of optical signals due to the acoustic noise signals, the first phase shift to the first plurality of optical signals being approximately identical to the first phase shift to the second plurality of optical signals; and
a secondary coupler connected to the first and the second secondary segments of optical fibers, and connected to a third segment of the optical fiber, the coupler operable to:
receive the first and second pluralities of modulated optical signals,
wherein the first phase shift to the first plurality of optical signals approximately cancels out the first phase shift to the second plurality of optical signals due to the first phase shift of the first plurality of optical signals and the first phase shift of the second plurality of optical signals being approximately identical.

10. The acoustic noise reduction system of claim 9, wherein the first sensor of the first acoustic noise reduction device is operable to detect a first desired signals, wherein the first sensor of the second acoustic noise reduction device is operable to detect a second desired signals, and wherein the first desired signals and the second desired signals have different signals characteristics.

11. The acoustic noise reduction system of claim 10, wherein the first desired signals and the second desired signals are indicative of different types of wellbore conditions.

12. The acoustic noise reduction system of claim 11, wherein the different types of wellbore conditions comprise pressure, temperature, pH, and humidity at a wellbore location proximate to one of the first and second acoustic noise reduction devices.

13. The acoustic noise reduction system of claim 10, further comprising a multiplexer configured to:
multiplex optical signals indicative of the first desired signals with optical signals indicative of the second desired signals to form a multiplexed signals; and
transmit the multiplexed optical signals to a square-law detector.

14. The acoustic noise reduction system of claim 9, wherein the primary coupler is further operable to:
receive a third plurality of optical signals from the first primary segment of the optical fiber;
divert a first component of the third plurality of optical signals to the first acoustic noise reduction device; and
divert a second component of the third plurality of optical signals to the second acoustic noise reduction device,
wherein the first component of the third plurality of optical signals provides power to the first acoustic noise reduction device, and
wherein the second component of the third plurality of optical signals provides power to the second acoustic noise reduction device.

15. The acoustic noise reduction system of claim 14, wherein the first component of the third plurality of optical signals has a signal intensity that is different from a signal intensity of the second component of the third plurality of optical signals.

16. The acoustic noise reduction system of claim 9, further comprising:

a third primary coupler connected to the second primary coupler via a fourth primary segment of the optical fiber; and
a third acoustic noise reduction device connected to the third primary coupler via a fifth primary segment of the optical fiber.

17. A method to reduce acoustic noise, the method comprising:
detecting, by a first sensor, acoustic noise signals and desired signals;
modulating, by the first sensor, a first plurality of optical signals traversing a first segment of optical fiber in response to detecting at least one of the acoustic noise signals and the desired signals,
wherein modulating by the first sensor creates at least one of a first phase shift to the first plurality of optical signals due to the acoustic noise signals and a second phase shift to the first plurality of optical signals due to the desired signals;
detecting, by a second sensor, the acoustic noise signals, the acoustic noise signals and the acoustic noise signals having approximately identical signal properties and intensities; and
modulating, by the second sensor, a second plurality of optical signals traversing a second segment of the optical fiber in response to detecting the acoustic noise signals,
wherein modulating by the second sensor creates a first phase shift to the second plurality of optical signals due to the acoustic noise signals, the first phase shift to the first plurality of optical signals being approximately identical to the first phase shift to the second plurality of optical signals, and
wherein the first phase shift to the first plurality of optical signals approximately cancels out the first phase shift to the second plurality of optical signals due to the first phase shift of the first plurality of optical signals and the first phase shift of the second plurality of optical signals being approximately identical.

18. The method of claim 17, further comprising:
diverting a first component of a third plurality of optical signals to the first segment of the optical fiber;
diverting a second component of the third plurality of optical signals to the second segment of the optical fiber;
providing the first component of the third plurality of optical signals to power to the first sensor; and
providing the second component of the third plurality of optical signals to power to the second sensor.

19. The method of claim 17, further comprising passing a component of the first plurality of modulated optical signals indicative of the desired signals via a third segment of the optical fiber to a square-law detector operable to detect the desired signals.

20. The method of claim 17, further comprising passing a component of the first plurality of modulated optical signals indicative of the desired signals via a third segment of the optical fiber to an optical detector operable to detect the desired signals.

* * * * *